United States Patent [19]

Uchimi

[11] Patent Number: 4,635,140
[45] Date of Patent: Jan. 6, 1987

[54] DIGITAL RECORDING/PLAYBACK SYSTEM WITH LIMITED FREQUENCY RANGE

[75] Inventor: Takashi Uchimi, Yokohama, Japan

[73] Assignee: Victor Company of Japan, Limited, Yokohama, Japan

[21] Appl. No.: 490,895

[22] Filed: May 2, 1983

[30] Foreign Application Priority Data

May 8, 1982 [JP] Japan ................................. 57-77258
May 8, 1982 [JP] Japan ................................. 57-77259

[51] Int. Cl.$^4$ ............................................... G11B 5/09
[52] U.S. Cl. ............................................... 360/40; 360/46
[58] Field of Search ...................... 360/41, 43, 46, 40

[56] References Cited

U.S. PATENT DOCUMENTS

| | | | |
|---|---|---|---|
| 3,597,751 | 8/1971 | Heidecker et al. | 360/43 |
| 3,603,945 | 9/1971 | Hertrich | 360/43 |
| 3,725,646 | 4/1973 | Smead | 360/43 |
| 3,794,987 | 2/1974 | Wabearn | 360/43 |
| 3,864,735 | 2/1975 | Davis et al. | 360/43 |
| 4,183,066 | 1/1980 | Anderson | 360/43 |
| 4,376,958 | 3/1983 | Pettigrew | 360/43 |

FOREIGN PATENT DOCUMENTS 865604 4/1961 United Kingdom ................. 360/43
1080138 8/1967 United Kingdom ................. 360/43

Primary Examiner—Vincent P. Canney
Attorney, Agent, or Firm—Jordan and Hamburg

[57] ABSTRACT

In a digital signal recording and playback system, digital data is provided by the pulse code modulation of an analog signal. The digital data is modulated into a digital signal in such a manner as to have a maximum reversal interval equal to the bit period of the original data and a minimum reversal interval equal to one half the bit period. Such a digital signal is recorded into and reproduced out of a recording medium. During recording, frequencies are selected for a first or high frequency component which repeats at the minimum reversal interval and a second or low frequency component which repeats at the maximum reversal interval, such that the playback level of the first frequency component becomes sufficiently lower than that of the second. During playback, the first frequency component is further attenuated relative to the second or fully removed and the playback level or the slice level is controlled with regard to the second component of the reproduced digital signal.

10 Claims, 27 Drawing Figures

DIGITAL RECORDING/PLAYBACK SYSTEM WITH LIMITED FREQUENCY RANGE

BACKGROUND OF THE INVENTION

The present invention relates to a system for recording into a recording medium or reproducing thereoutof a digital signal produced by modulating original digitized data, which is prepared by the pulse code modulation (PCM) of an analog signal, such that the digital signal has a maximum reversal interval equal to the bit period of the digital data and a minimum reversal interval that is one half the bit period.

In a magnetic data recording and playback system, an analog signal may be digitized by the PCM system and the resulting signal may be further modulated by a certain system to prepare a digital signal, which is capable of self-clocking. As generally accepted in the art, recording and reproducing such a digital signal into and out of a magnetic medium is far more desirable in reducing the influence of distortion of the magnetic medium or that of irregular operation of a drive line on the reproduced signal and thereby promoting high quality signal recording and playback, than simply recording and reproducing an analog signal directly into a magnetic medium. Typical of such digital signals is one which is provided by the frequency modulation (FM) system to reverse itself at a minimum reversal interval, which is one half the bit period of original data prepared by the PCM system, when the original data is (logical) "1" and at a maximum reversal interval equal to the bit period when the original data is "0". This type of digital signal will hereinafter be referred to as "digital FM signal" for convenience.

In the prior art digital signal recording and playback system discussed above, demodulation is effected by determining whether a pulse duration of the reproduced digital signal is the maximum reversal interval or the minimum reversal interval, that is, whether it is a repetitive frequency component of the maximum reversal interval (called frequency component "F" hereinafter) or a repetitive frequency component of the minimum reversal interval (called frequency component "2F" hereinafter). The result is the need for a recording and playback signal transmission system for the magnetic medium which has a band wide enough to transmit even the higher frequency component 2F without substantial attenuation, e.g. FM demodulator circuit. This sets limits to an increase in recording desity available for a magnetic recording and playback device for public use, the signal band of which is designed relatively narrow from the economic standpoint.

SUMMARY OF THE INVENTION

It is therefore an object of the present invention to provide a digital signal recording and playback system which accommodates a higher recording density and thereby a larger amount of data to be recorded and reproduced.

It is another object of the present invention to provide a digital signal recording and playback system which is capable of remarkably cutting down the error rate.

It is another object of the present invention to provide a digital signal recording and playback system which is effectively applicable to a video recorder or like recording and playback device for public use in which the available transmission frequency band of the recording and playback line is relatively narrow.

It is another object of the present invention to provide a generally improved digital signal recording and playback system.

In accordance with the present invention, in a digital signal recording and playback system, digital data is provided by the pulse code modulation of an analog signal. The digital data is modulated into a digital signal in such a manner as to have a maximum reversal interval equal to the bit period of the original data and a minimum reversal interval equal to one half the bit period. Such a digital signal is recorded into and reproduced out of a recording medium. During recording, frequencies are selected for a first or high frequency component which repeats at the minimum reversal interval and a second or low frequency component which repeats at the maximum reversal interval, such that the playback level of the first frequency component becomes sufficiently lower than that of the second. During playback, the first frequency component is further attenuated relative to the second or fully removed and the playback level or the slice level is controlled with regard to the second component of the reproduced digital signal.

The above and other objects, features and advantages of the present invention will become apparent from the following detailed description taken with the accompanying drawings.

BRIEF DESCRIPTION OF THE DRAWINGS

FIGS. 3a-3g are diagrams showing waveforms of various signals which represent the operation of the system shown in FIG. 2;

DESCRIPTION OF THE PREFERRED EMBODIMENT

While the digital signal recording and playback system of the present invention is susceptible of numerous physical embodiments, depending upon the environment and requirements of use, a substantial number of the herein shown and described embodiment have been made, tested and used, and all have performed in an eminently satisfactory manner.

Figure 1:
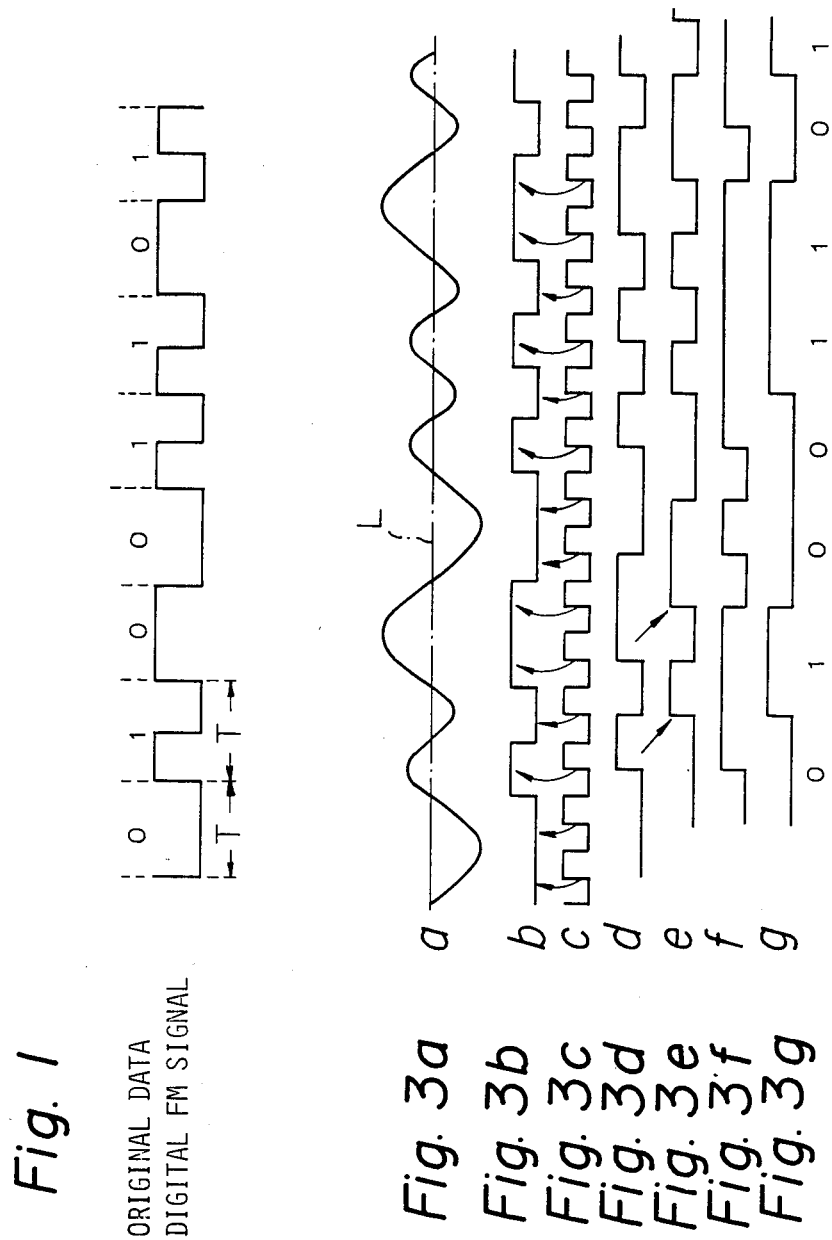
FIG. 1 is a diagram showing an example of original digital data and a digital signal provided by the frequency modulation of the digital data.

Referring to FIG. 1 of the drawings, there is shown a relationship between an example of original data produced by modulating an analog signal by the PCM system and a digital signal capable of self-clocking and produced by modulating the original data by the FM system. The principle of the FM system is such that the resulting signal will have been reversed at a minimum reversal interval when original data is (logical) "1" and at a maximum reversal interval identical with a bit period T when the original data is "0". In a prior art system for recording and reproducing such a digital FM signal, a playback section includes a demodulator circuit which may have the construction illustrated in FIG. 2 by way of example.

Figure 2:
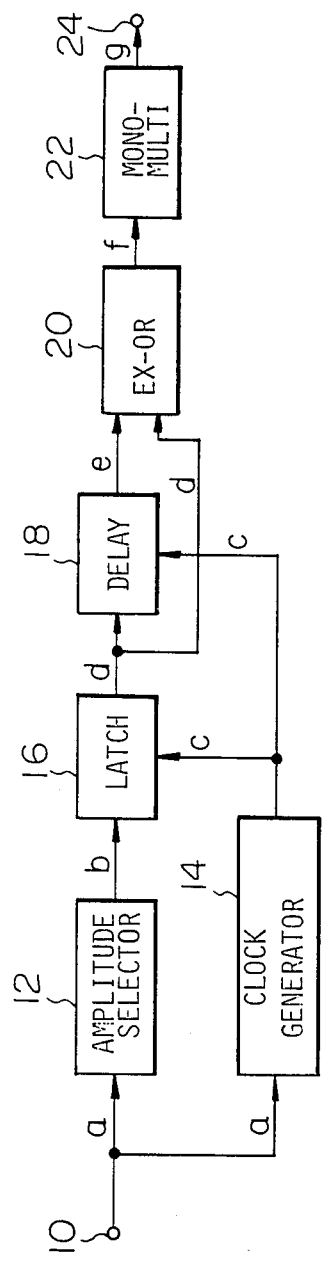
FIG. 2 is a block diagram of an exemplary demodulator circuit of a prior art digital signal recording and playback system.

Referring to FIG. 2, a digital FM signal a coming in through an input terminal 10 is supplied to an amplitude selector circuit 12 which may comprise a limiter, a slicer or the like. The waveform of the digital FM signal a is shown in FIG. 3a. The amplitude selector 12 compares the signal a with a predetermined zero-cross or reference level L shown in FIG. 3a. The output of the amplitude selector 12, as shown in FIG. 3b, will be a train of pulses b which are high level when the signal a is higher than the zero-cross level L and low level when it is lower than the zero-cross level L. The signal a is also fed to a clock generator 14 which then generates a train of clock pulses c as shown in FIG. 3c. The clock pulses c are synchronous in phase with the signal a and have a period which is identical with the minimum reversal interval of the signal a. The clock pulses c are supplied to a latch circuit 16 so that the pulses b from the amplitude selector 12 are latched at the leading edges of the clock pulses c as indicated by arrows in FIG. 3c. The output d of the latch 16, appearing as shown in FIG. 3d, is applied to a delay circuit 18 to be delayed by one period of the clock pulses c. This results a pulse signal e shown in FIG. 3e.

The input pulses d and output pulses e of the delay circuit 18 are commonly fed to an Exclusive OR gate 20 to be processed thereby into a pulse train f shown in FIG. 3f. The pulses f are sequentially gated into a monostable multivibrator 22 to trigger it at their trailing edges. Every time the multivibrator 22 is triggered, it will generate a low level pulse the duration of which is identical with the bit period T shown in FIG. 1. As viewed in FIG. 3g, the output g of the multivibrator 22 has a waveform which is low level when the original data is "0" and high level when it is "1". The signal g is delivered to an output terminal 24 as a demodulated version of the digital FM signal.

As previously stated, the prior art digital signal demodulator performs demodulation by determining whether a pulse duration of a digital signal coincides with the maximum inversion interval or the minimum inversion interval. This is undesirable because the system for writing data into or reading data out of a magnetic medium is required to have a band which is wide enough to transmit even the high frequency component 2F with hardly any attenuation.

Referring to FIGS. 4–9, the digital signal recording and playback system embodying the present invention is shown. While the system of the present invention is applicable to various kinds of recording and playback devices, the description will concentrate on a helical scan type video tape recorder (VTR) for family use for simplicity.

Figure 4:
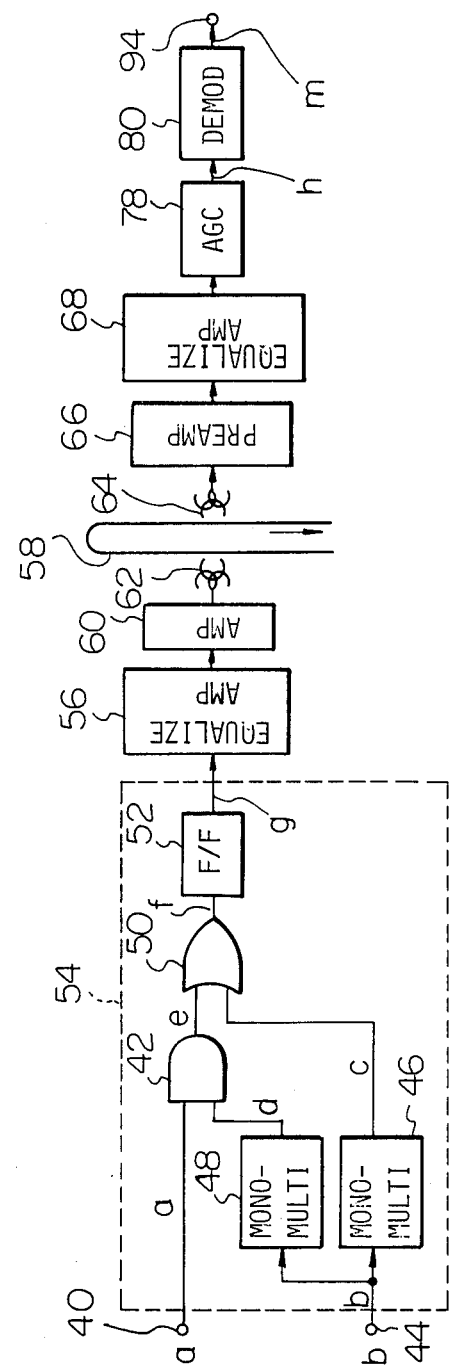
FIG. 4 is a block diagram of a recording section and a playback section of a digital signal recording and playback system embodying the present invention.
Figure 5:
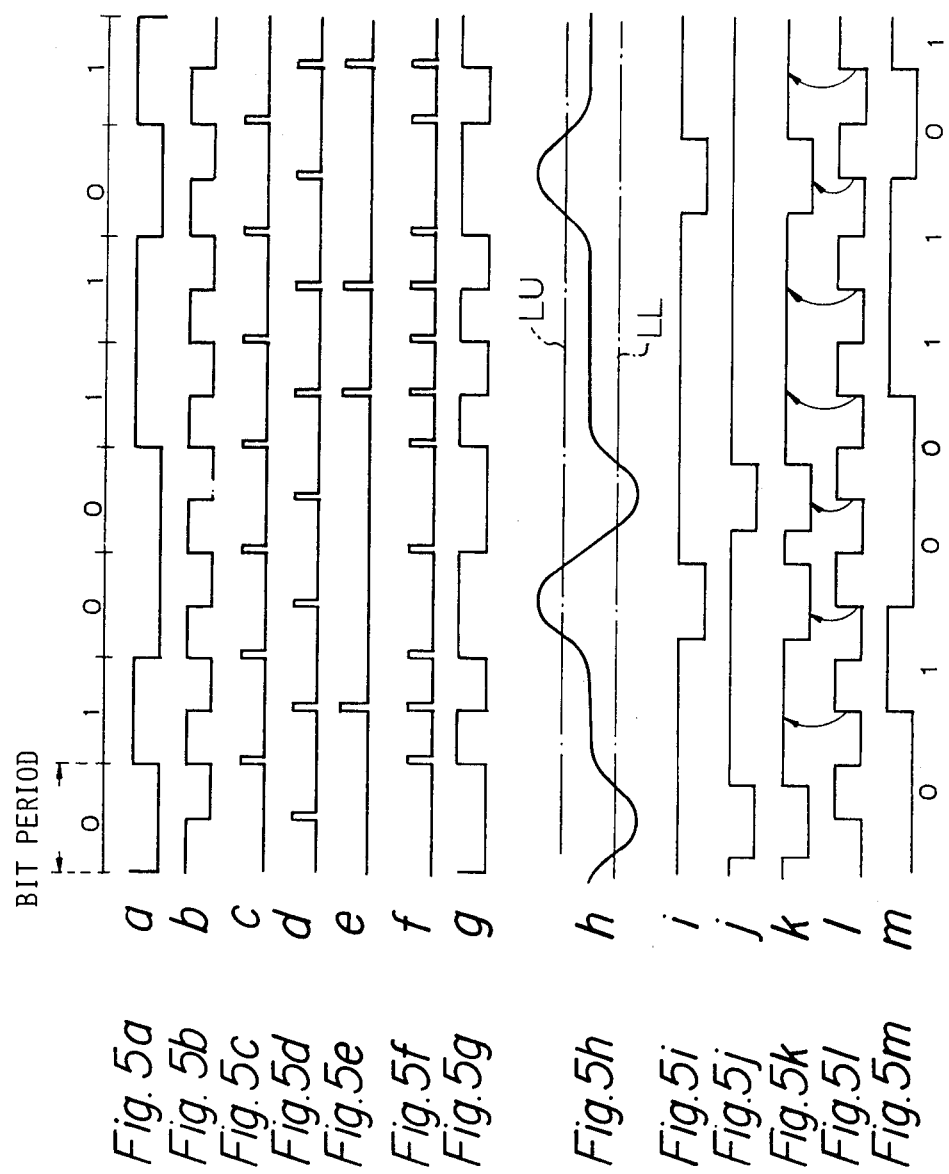
FIGS. 5a-5m are diagrams of signal waveforms which will appear in various portions of the constructions shown in FIGS. 4 and 8.
Figure 6:
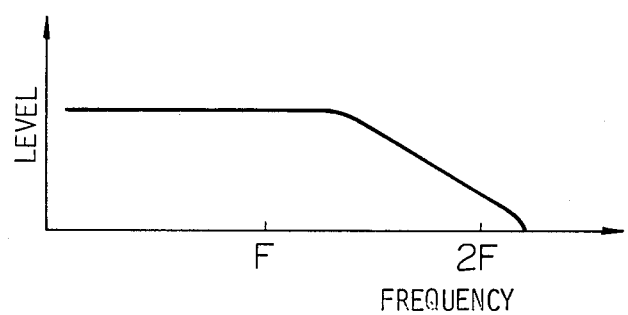
FIG. 6 is a graph showing an exemplary relationship between a transmission frequency characteristic of the system shown in FIG. 4 and frequency components contained in a digital signal to be recorded and reproduced.

Shown in FIG. 4 in block diagram are a recording section and a playback section constructed in accordance with the present invention. Digital data a shown in FIG. 5a is supplied to the system through a data input terminal 40. The digital data a has been prepared by the pulse code modulation of any desired analog signal such as a video signal, audio signal, cue signal or address signal. The input a of the system is fed to one input terminal of a two-input AND gate 42. The digital data a is in the form of a binary pulse train whose level varies in correspondence with logical levels shown above the waveform of FIG. 5a. In this particular embodiment, the digital data is assumed to be a so-called Non-Return-to-Zero (NRZ) signal which will be low level in response to "0" and high level in response to "1".

Supplied to a second input terminal 44 are clock pulses b which are phase-synchronous with the digital data a and have a period equal to the minimum reversal interval (bit period) of the digital data a. The clock pulses b, shown in FIG. 5b, are fed to monostable multivibrators 46 and 48. The multivibrator 46 generates pulses c which are phase-synchronous with the leading edges of the clock pulses b, as shown in FIG. 5c. The other multivibrator 48 generates pulses d in synchronism with the trailing edges of the clock pulses b as shown in FIG. 5d, the pulses d being delivered to the other input terminal of the AND gate 42. The gate 42 provides AND of the digital data a and pulses d to produce an output signal e as shown in FIG. 5e. The signal e is fed to the other input terminal of the OR gate 50. A signal f, therefore, appears at the output of the OR gate 50 as indicated in FIG. 5f and is gated into a flip-flop 52. The output g of the flip-flop 52 is shown in FIG. 5g which reverses in response to every one of the pulses f.

When the digital data a is "1", the pulse signal g is a high frequency component 2F which reverses at an interval equal to one half the bit period and, when the digital data is "0", a low frequency component F inverting at the bit period, i.e., identical with the bit transfer frequency. The pulse signal g, therefore, constitutes a digital FM signal as discussed with reference to FIG. 1. In FIG. 4, a circuit section, generally 54, extending from the input terminal 40 to the flip-flop 52 serves the function of a digital frequency modulator.

The digital FM signal g output from the flip-flop 52 is fed to a record equalizer/amplifier 56. The equalizer/amplifier 56 adjusts the gain to frequency and phase to frequency characteristics of the input g so that optimal magnetization may be attained on a magnetic medium in the form of a tape 58. The output of the equalizer/amplifier 56 is amplified by a record amplifier 60 up to a given necessary level and then fed to a record head 62 to be written into the tape 58.

A characteristic feature of this embodiment is that the frequency components F and 2F of the digital FM signal g are written into the tape 58 such that the component 2F will be reproduced at a sufficiently low level relative to the component F, e.g. 1/10 or less. This may be implemented by recording the signal while attenuating the component 2F relative to the component F. However, considering the fact that magnetic recording and playback inherently attenuates high frequency components, what will be more advantageous is to record the components F and 2F at a same level while selecting such frequencies which do not permit the component 2F to be reproduced but at a sufficiently low level compared to the component F. This would make it needless to install an additional circuit for the attenuation purpose in the recording section. In practice, for a magnetic recording and playback characteristic shown in FIG. 6, the component 2F will have a frequency which neighbors the reproducible upper frequency limit. For example, supposing that the record head 62, as well as a playback head 64 which will be described, is a rotary head and that the magnetic recording and playback characteristic starts attenuation at a frequency on the order of 5 MHz, attenuates by 5–10 dB at about 6 MHz and 20–25 dB at about 7 MHz, 3.5 MHz will be selected for the component F and 7 MHz for the component 2F. If desired, the component F may have a frequency which almost disenables the other frequency component 2F to be reproduced, e.g. 4 MHz.

The system will be operated as follows for reproducing the signal out of the tape 58. The playback head 64 reads the digital FM signal out of the tape 58 and supplies it to a playback preamplifier 66, which functions to amplify the input to a given level sufficient for the operations of subsequent circuits. The output of the preamplifier 66 is fed to a playback equalizer/amplifier 68 which then adjusts the gain to frequency and phase to frequency characteristics thereof. It will be noted here that the digital FM signal input into the equalizer/amplifier 68 has a blunted waveform with higher harmonics removed, rather than the rectangular waveform shown in FIG. 5g. The equalizer/amplifier 68 is constructed to make the gain associated with the frequency component 2F sufficiently smaller than one associated with the frequency component F, e.g. on the order of 1/10 or less. Essential part of the equalizer/amplifier 68 for attaining such a function is illustrated in FIG. 7.

Figure 7:
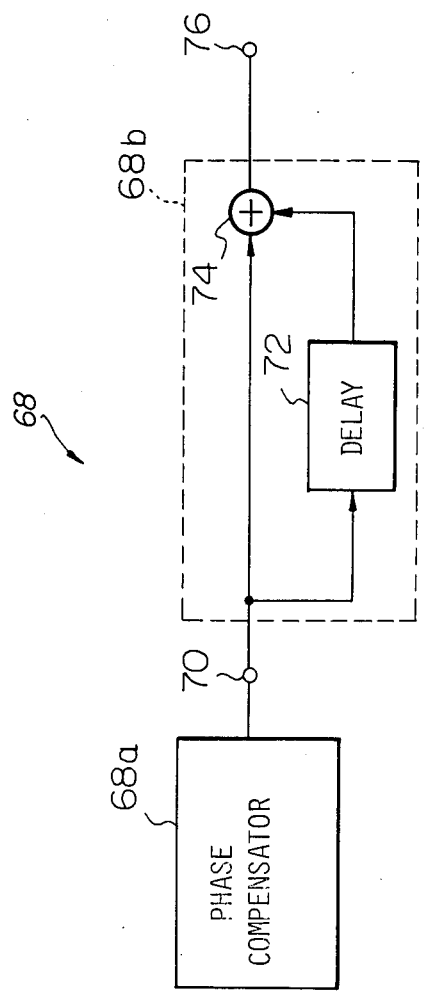
FIG. 7 is a block diagram of a playback equalizer/amplifier included in the system of FIG. 4.

Referring to FIG. 7, a phase compensator circuit 68a connects to a gain adjuster circuit 68b. The phase compensator 68a processes the reproduced digital FM signal to minimize the interference in waveform between adjacent bits of the signal. The output of the phase compensator 68a is fed from an input terminal 70 to a delay circuit 72 and an adder circuit 74. The delay time of the delay circuit 72 is predetermined to be equal to half a period of the frequency component 2F, i.e. $\frac{1}{4}$F. The output of the delay 72 is gated into the adder 74 which provides the sum of the delayed signal and the non-delayed signal. The sum output of the adder 74 is delivered to an output terminal 76. By this procedure, the frequency component 2F in the signal fed to the input terminal 70 will have been sufficiently suppressed compared to the frequency component F when it appears at the output terminal 76. Although the playback equalizer/amplifier 68 in itself is needless in view of the frequency component 2F which has been recorded by the recording section to be reproduced at a far lower level than the frequency component F, it will effectively assist the recording section as may be required by the latter.

Figure 9:
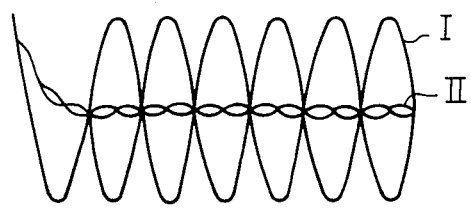
FIG. 9 is a sketch of a waveform which represents a digital signal reproduced by the system of the present invention and appeared on an oscilloscope.

The digital FM signal output from the equalizer/amplifier 68 and having the above-mentioned nature is applied to an automatic gain control(AGC) circuit 78 shown in FIG. 4, whereby its gain is automatically adjusted such that the peak of the frequency component F remain at a constant value. As a result, the output h of the AGC circuit 78 will have a waveform which, as shown in FIG. 5h, has a sufficiently suppressed frequency component 2F and a frequency component F having a constant peak. A demodulator 80 of the playback section demodulates the output of the AGC circuit 78 into the original digital data as will be descibed. The output waveform of the AGC circuit 78 appeared as shown in FIG. 9 when observed through an oscillocope. It will be seen in FIG. 9 that the frequency component 2F, II in the drawing, is far lower in level than the frequency component F, I in the drawing. The waveform of FIG. 9 is essentially the same as the waveform of FIG. 5h although appearing different therefrom in FIG. 9 due to repeated sweeping.

Figure 8:
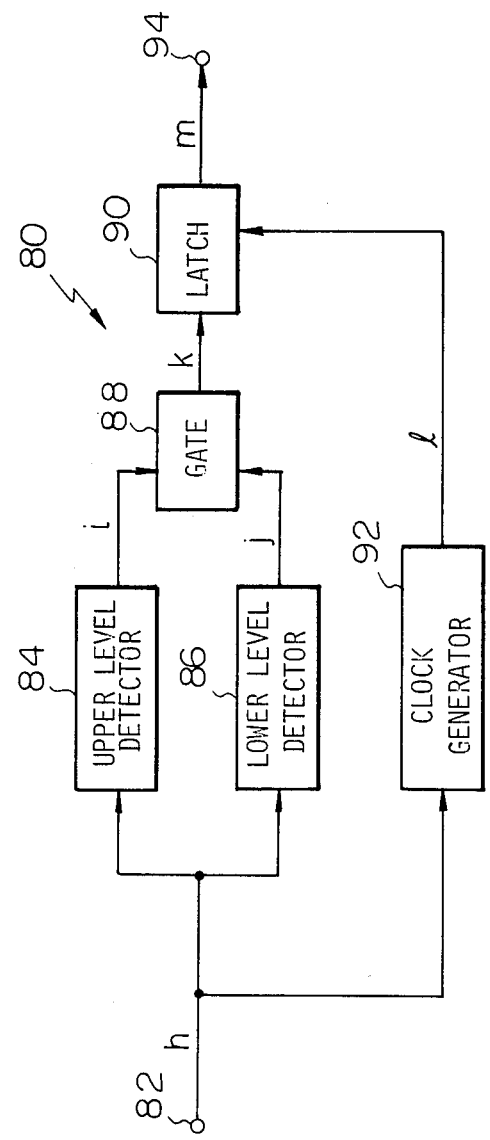
FIG. 8 is a block diagram of an exemplary demodulator circuit also included in the system of FIG. 4.

Referring to FIG. 8, the demodulator 80 of the playback section is shown in detail. The output h of the AGC circuit 78 coming in through an input terminal 82 is gated into an upper level detector 84 to be compared with a first slice level LU shown in FIG. 5h. The upper level detector 84 supplies a gate circuit 88 with its output pulse signal i which is low level when the signal h is higher than the slice level LU, as illustrated in FIG. 5i. The signal h is also supplied to a lower level detector 86 to be compared with a second slice level LL also indicated in FIG. 5h. The output of the lower level detector 86 is a pulse signal j shown in FIG. 5j which is low level when the signal h remains lower than the slice level LL, the pulse signal j being applied to the gate circuit 88.

The gate 88, which may be an AND gate in this embodiment, passes therethrough the low levels of the pulse signals i and j while they remain low level. Therefore, as shown in FIG. 5k, the output of the gate 88 will be a pulse signal k which becomes low level in positional correspondence with the frequency component F of the input signal h. While the pulses i and j are shown as being negative in FIGS. 5i and 5j, they may be positive in which case use may be made of a NOR gate as the gate 88 to attain the waveform k shown in FIG. 5k. The output k of the gate 88 is fed to a latch circuit 90.

Further, the signal h is supplied to a clock generator 92. The clock generator 92 generates clock pulses l which are phase-synchronous with the signal h and having a repetition frequency 2F as shown in FIG. 5l. The clock pulses l are delivered to the latch 90 as latch pulses so that the pulse signal k is latched at the leading edge of each latch pulse l. The output m of the latch 90 shown in FIG. 5m is sent out to an output terminal 94 shown in FIGS. 4 and 8. Comparing FIG. 5m with FIG. 5a, it will be been that the pulse signal m is a demodulated signal which represents "0" when low level and "1" when high level.

Thus, in recovering the original digital data, the playback level or the slice levels LU and LL are controlled with regard to the specific frequency component F. This allows the component 2F in the digital FM signal to be recorded and reproduced at a far lower level than the other component F. Therefore, the transmission frequency band in the recording and playback system needs only to transfer the lower frequency component F at a sufficiently high level, as opposed to the prior art system which was required to record and reproduce even the higher frequency component 2F at a sufficiently high level. This permits the selection of a higher frequency for the component F and thereby a larger amount of data to be recorded and reproduced, i.e. higher recording density.

Transmission systems for digital signals known in the art include the partial response type system which does not transmit d.c. components and may be regarded as a system which does not record the frequency component 2F of the digital FM signal. In contrast, the present invention actually records the frequency component 2F so that the transitional response from the component 2F to the component F or vice versa during playback is quite smooth. Experiments proved that the system of the invention is far advantageous over the partial response type system concerning the resulting error rate.

The embodiment has been shown and described as employing the FM system for the modulation of a digital signal. However, this is only for illustrative purpose and may be replaced by any other suitable modulation system (e.g. phase encoding (PE) system) insofar as it is capable of producing a digital signal which has a maximum reversal interval common to the bit period of original data and a minimum reversal interval equal to one half the bit period.

In summary, it will be seen that the digital data recording system in accordance with the present invention selects frequencies for a first frequency component 2F in a digital signal, which is equal to the reciprocal of a minimum reversal interval, and a second frequency component F, which is equal to the reciprocal of a maximum reversal interval, such that the playback level of the first component 2F becomes sufficiently lower than that of the second component F. This insures a room for a larger amount of data to be recorded, or higher recording density, while accomplishing a decrease in error rate which is incomparable to the partial response type system.

The first frequency component 2F is recorded with a frequency which is close to the upper frequency limit of the transmission frequency band of a recording and playback system. Therefore, the effects stated above are achievable without any additional circuit in the recording section which would otherwise be required for attenuating the first component 2F relative to the second F.

Furthermore, the recording and playback system of the invention is constructed such that the first compnent 2F of the digital signal written into a recording medium by the above-mentioned recording system and then read thereoutof is additionally attenuated or removed and, with regard to the second component F of the reproduced digital signal, the playback level or the slice level is controlled to demodulate the digital signal. Therefore, even though the recording section may fail to make the playback level of the first component 2F sufficiently lower than that of the second F in recording the signal, the playback section will successfully assist the recording section to attain the desired effect. This will improve the data recording density. Because a signal can be reproduced observing only the second component F having a lower frequency, the transmission frequency band of the system will suffice if capable of transmitting the second component F only. For these reasons, the present invention will prove particularly advantageous when applied to a video recorder or like data recording and playback device for public use, in which the available transmission frequency band of the system is relatively narrow.

Various modifications will become possible for those skilled in the art after receiving the teachings of the present disclosure without departing from the scope thereof.

What is claimed is:

1. A system for converting an analog signal into a digital signal and recording the digital signal into and reproducing the digital signal out of a recording medium, said system comprising:

original data generating means for generating original data by a digital pulse code modulation of the analog signal;

modulating means for modulating the original data to generating a digital signal which has a maximum reversal interval equal to a bit period of the original data and a minimum reversal interval equal to one half the bit period;

frequency selecting means for selecting frequencies for a first frequency component in the digital signal which is equal to the reciprocal of the minimum reversal interval and a second frequency component which is equal to the reciprocal of the maximum reversal interval, such that the playback level of the first frequency component becomes lower than the playback level of the second frequency component; and performing means operable during reproduction of the digital signal for making the first frequency component in the reproduced digital signal attenuated relative to the second frequency component and removing the first frequency component;

said performing means comprising delay means for delaying the reproduced digital signal and adder means for providing the sum of the delayed signal and the non-delayed signal whereby the first frequency component is suppressed compared to the second frequency component.

2. A system as claimed in claim 1, further comprising means for controlling, during reproduction of the digital signal, at least one of the playback level and a slice level with regard to the second frequency component in the reproduced digital signal.

3. A system as claimed in claim 1, in which the frequency selecting means is constructed to select a frequency for the first frequency component which is close to an upper reproducible frequency limit of a transmission frequency band of a recording and reproducing system.

4. A system as claimed in claim 1, in which the modulating means comprises frequency modulation.

5. A system as claimed in claim 1, in which the modulation means comprises phase encoding.

6. A system as claimed in claim 1, in which said delay means is constructed to delay the reproduced digital signal by half a bit period of the first frequency component.

7. An apparatus for demodulating a digital signal which is produced by modulating original data, which is prepared by a digital pulse code modulation of an analog signal, such that the digital signal has a maximum reversal interval equal to a bit period of the original data and a minimum reversal interval equal to one half the bit period, said apparatus comprising:

performing means for making a first frequency component in the digital signal, which is equal to the reciprocal of the minimum reversal interval, attenuated relative to the second frequency component and removing the first frequency component; and control means for controlling at least one of the playback level and a slice level with regard to the second frequency component;

said performing means comprising delay means the digital signal and adder means for providing the sum of the delayed signal and the non-delayed signal whereby the first frequency component is suppressed compared to the second frequency component.

8. An apparatus as claimed in claim 7, in which said delay means is constructed to delay the digital signal by half a bit period of the first frequency component.

9. A system for converting an analog signal into a digital signal and recording the digital signal into and reproducing the digital signal out of a recording medium, said system comprising:

original data generating means for generating original data by a digital pulse code modulation of the analog signal;

modulating means for modulating the original data to generate a digital signal which has a maximum reversal interval equal to a bit period of the original data and a minimum reversal interval equal to one half the bit period;

frequency selecting means for selecting frequencies for a first frequency component in the digital signal which is equal to the reciprocal of the minimum reversal interval and a second frequency component which is equal to the reciprocal of the maximum reversal interval, such that the playback level of the first frequency component becomes lower than the playback level of the second frequency component;

performing means operable during reproduction of the digital signal for making the first frequency component in the reproduced digital signal attenuated relative to the second frequency component and removing the first frequency component, said performing means comprising delay means for delaying the reproduced digital signal and adder means for providing the sum of the delayed signal and the non-delayed signal whereby the first frequency component is suppressed compared to the second frequency component; and control means for controlling, during reproduction of the digital signal, at least one of the playback level and a slice level with regard to the second frequency component in the reproduced digital signal.

10. A system as claimed in claim 9, in which said delay means is constructed to delay the reproduced digital signal by half a bit period of the first frequency component.

* * * * *